(12) United States Patent
Maeda

(10) Patent No.: US 7,264,719 B2
(45) Date of Patent: Sep. 4, 2007

(54) PARTICLES WITH SILVER CARRIED AND PRODUCING METHOD THEREOF

(76) Inventor: Yoshiaki Maeda, 1-2-B24-307, Fujishirodai, Suita-shi, Osaka-fu (JP)

( * ) Notice: Subject to any disclaimer, the term of this patent is extended or adjusted under 35 U.S.C. 154(b) by 266 days.

(21) Appl. No.: 11/009,225

(22) Filed: Dec. 10, 2004

(65) Prior Publication Data
US 2005/0126970 A1    Jun. 16, 2005

(30) Foreign Application Priority Data

Dec. 11, 2003 (JP) ............................. 2003-413866
Nov. 8, 2004 (JP) ............................. 2004-323130

(51) Int. Cl.
  *B01D 24/00*  (2006.01)
  *B01D 39/06*  (2006.01)
  *C02F 1/50*   (2006.01)

(52) U.S. Cl. .................. 210/263; 210/501; 210/503

(58) Field of Classification Search ............... 210/169, 210/263, 500.1, 501, 167.13, 503
See application file for complete search history.

(56) References Cited

U.S. PATENT DOCUMENTS

| | | | |
|---|---|---|---|
| 4,735,655 A * | 4/1988 | Weis et al. | 75/231 |
| 5,334,809 A * | 8/1994 | DiFrancesco | 200/262 |
| 2002/0096254 A1* | 7/2002 | Kober et al. | 156/307.3 |
| 2004/0109808 A1* | 6/2004 | Lee et al. | 423/263 |
| 2005/0245179 A1* | 11/2005 | Luedeke | 451/59 |
| 2006/0090593 A1* | 5/2006 | Liu | 75/252 |

FOREIGN PATENT DOCUMENTS

| | | |
|---|---|---|
| JP | 49-61950 | 6/1974 |
| JP | 60-181002 | 9/1985 |
| JP | 1-283204 | 11/1989 |

* cited by examiner

*Primary Examiner*—Fred G. Prince
(74) *Attorney, Agent, or Firm*—Merchant & Gould P.C.

(57) ABSTRACT

To provide particles for water disinfection which are hard to be suspended and are hard to be diffused in water which is suitable for use of disinfecting water and which are capable of developing disinfection effect fully and method of producing the same.

Particles for water disinfection in which silver is coated on a garnet surface or a particle surface whose main ingredient is garnet are used. When said particles are used, preferable embodiment of silver is that the granular lumps of silver are carried continuously and discontinuously forming a group on a garnet surface as shown in SEM photographs of FIG. 4.

Effective production method of such particles can be conducted by the electroless plating method in which garnet particles are immersed in a mixed solution composed of reducing solution in which at least any one of potassium sodium tartarate, glucose, or acetardehyde as a reducing agent is dissolved in water, silver nitrate solution, and ammonium solution.

2 Claims, 6 Drawing Sheets

[FIG.1]
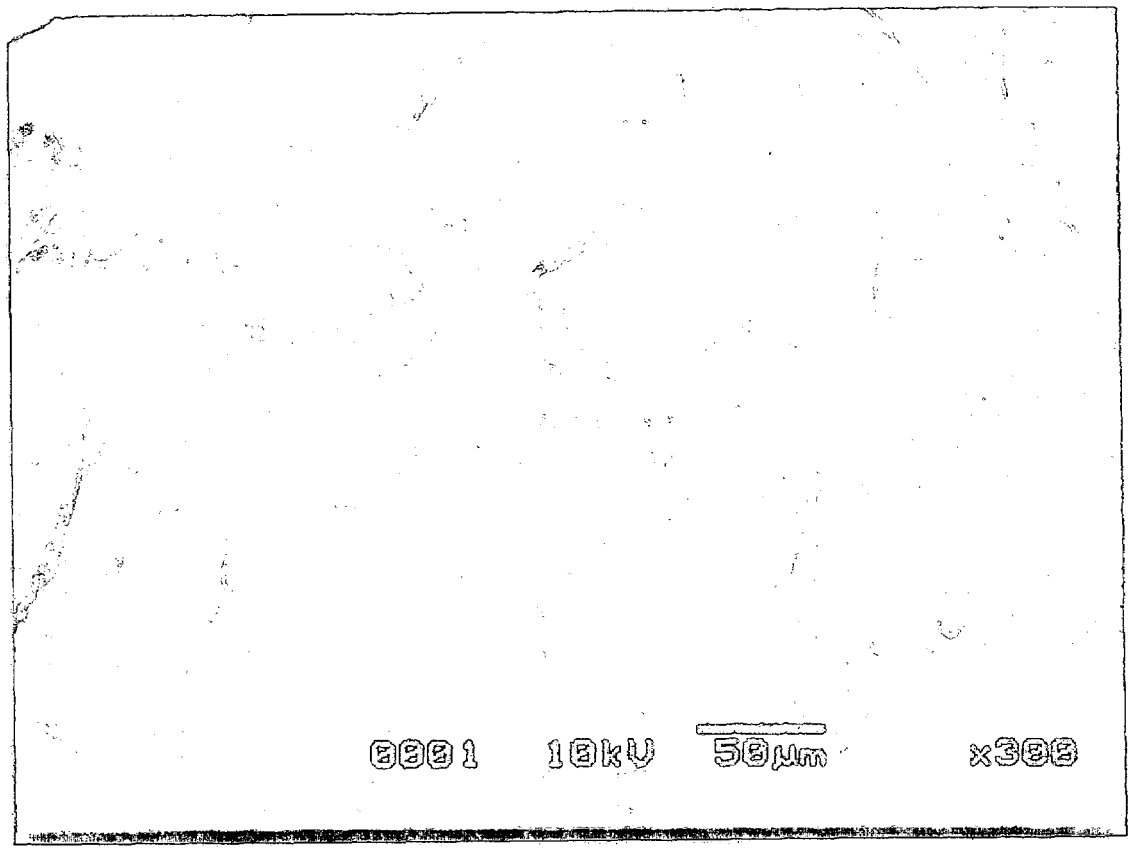

[FIG.2]
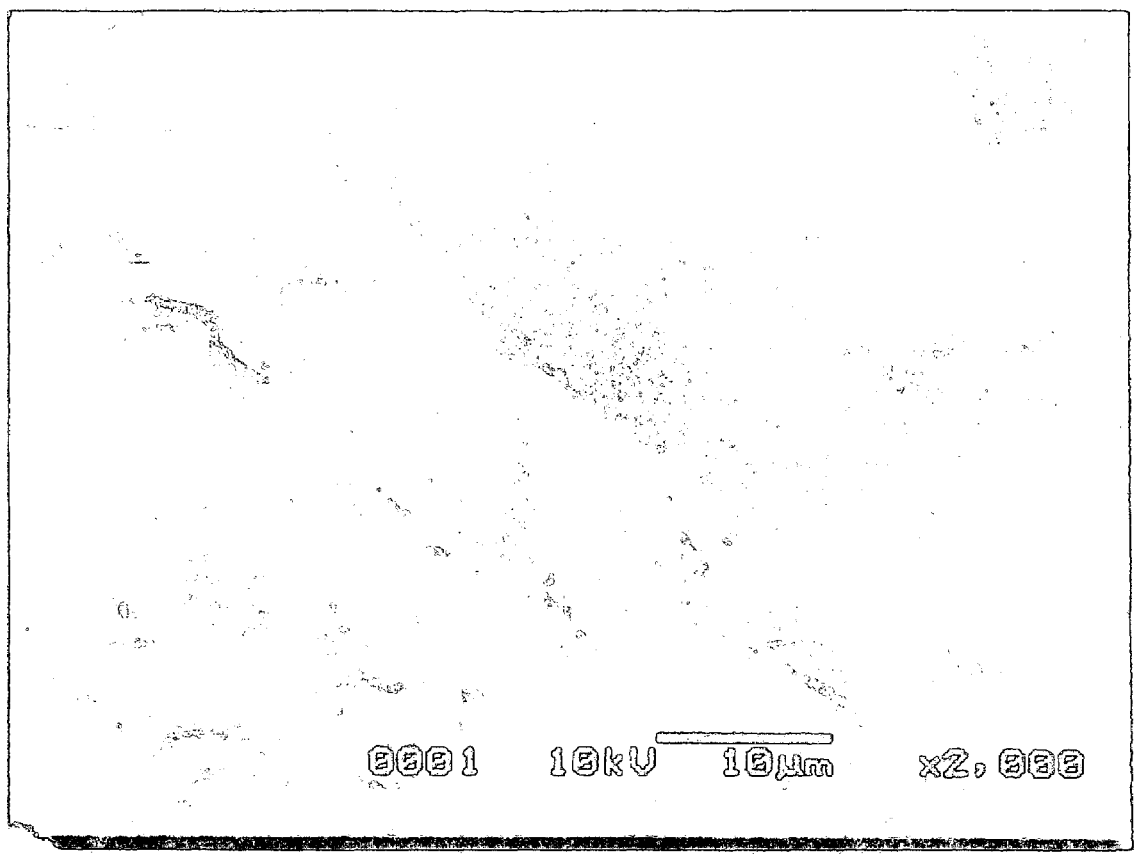

[FIG.3]
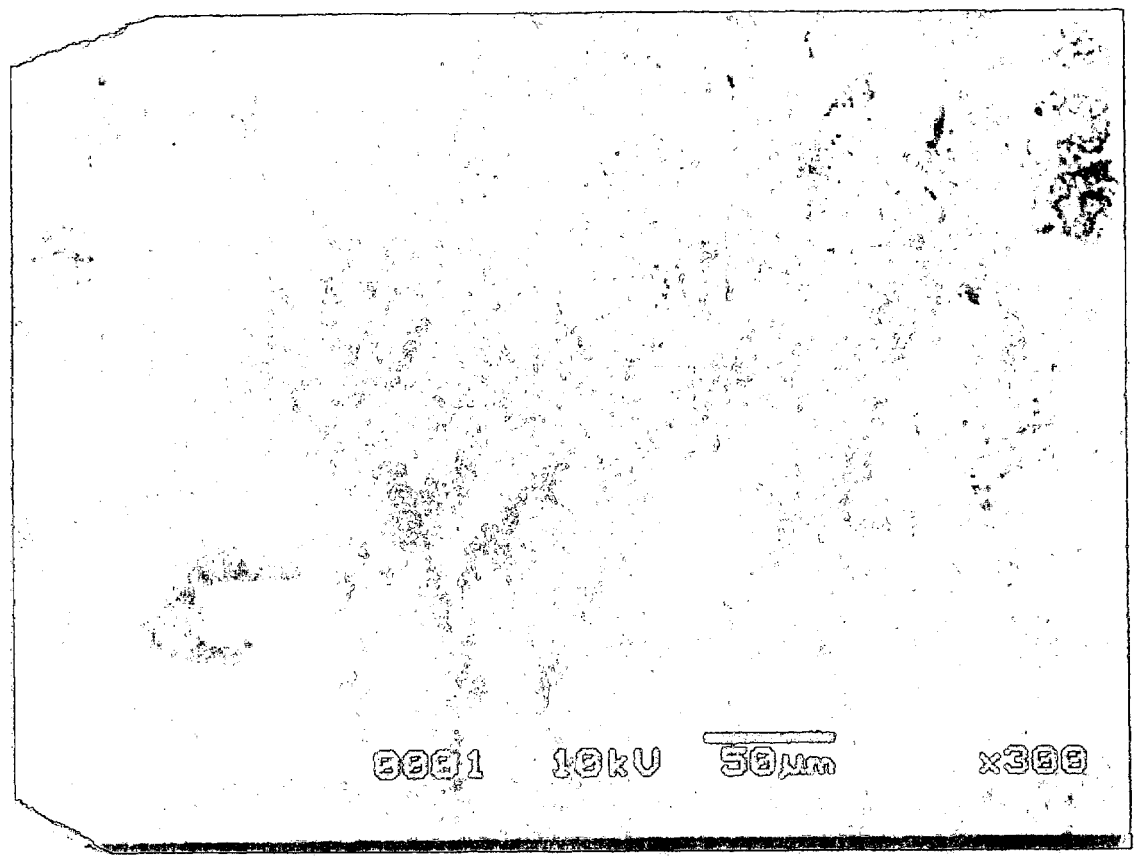

[FIG.4]
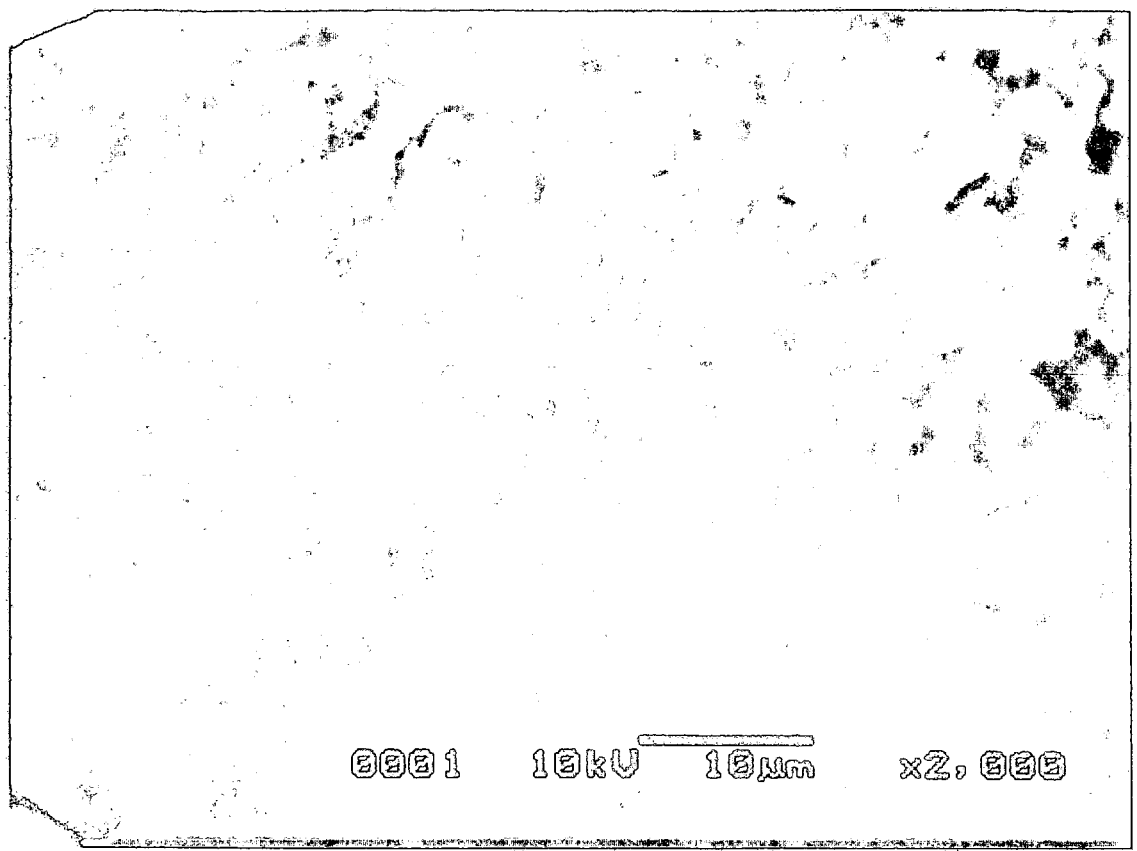

[FIG.5]
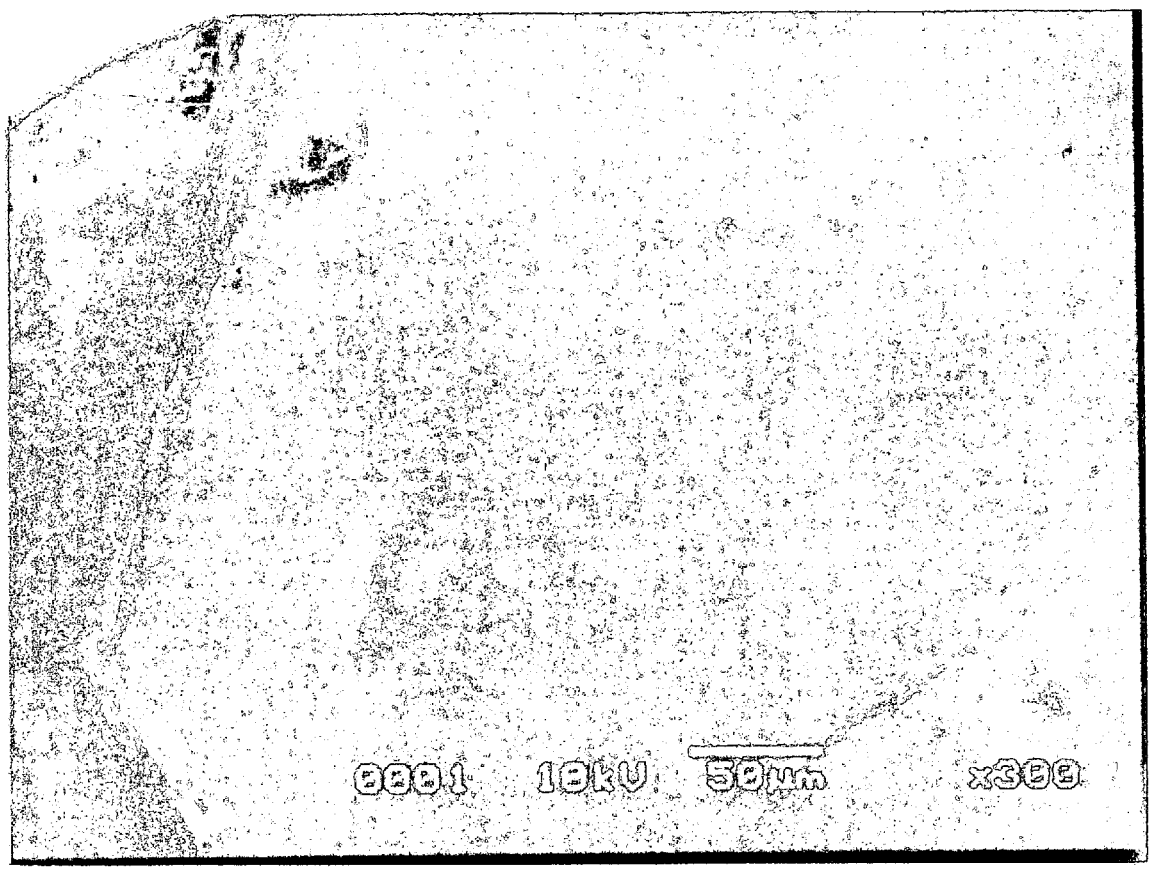

[FIG.6]
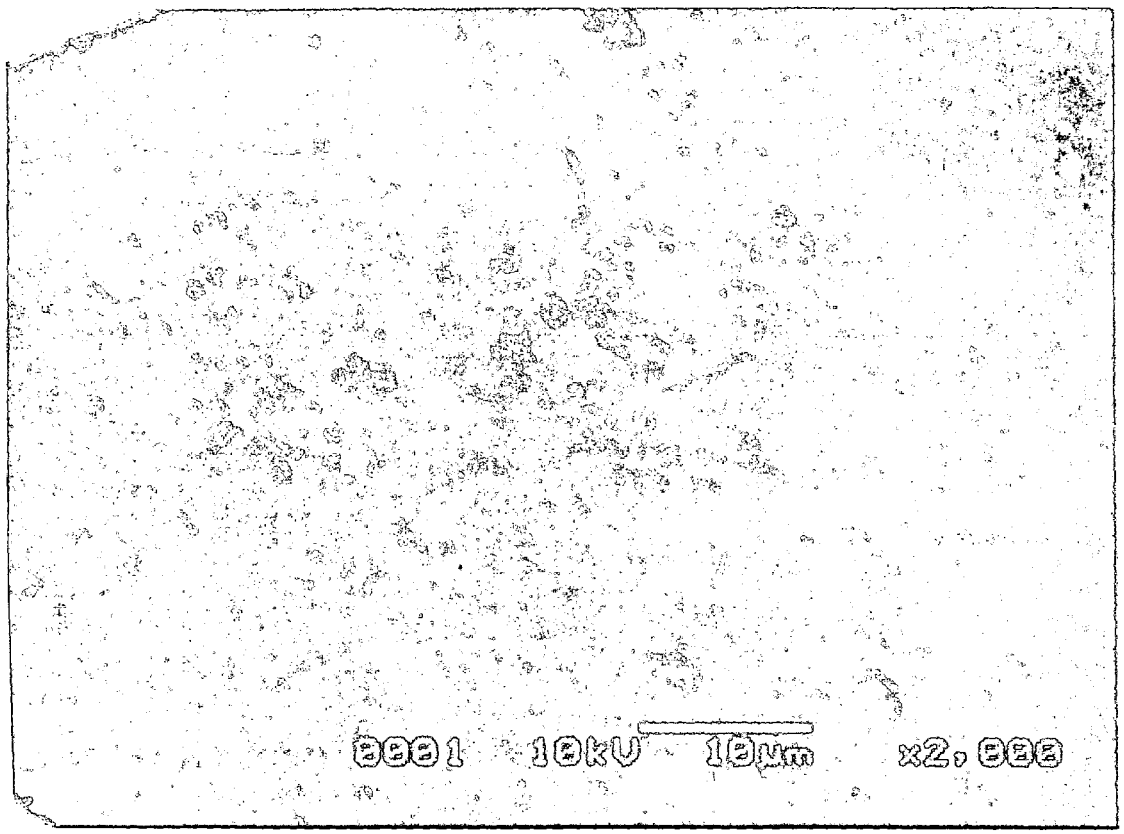

PARTICLES WITH SILVER CARRIED AND PRODUCING METHOD THEREOF

BACKGROUND OF THE INVENTION

1. Field of the Invention

The present invention relates to particles for disinfection treatment of drinking water, of static water, and the like and the use thereof, and the producing method thereof and further relates to members for cleaning water using said particles

2. Description of Related Art

Generally, drinking water or static water such as water in swimming pools and the like is disinfected by chlorine. However, in static water such as water in swimming pools or in water tanks, as time passes, chlorine vaporizes gradually. On the other hand, regarding drinking water, with the back ground of health consciousness, in many cases chlorine ingredient has been removed by using a water purification apparatus. In such drinking water with little content of chlorine ingredient, various bacteria and the like are liable to grow. Regarding others, baths provided with circulating septic tanks which are used by circulating hot water by circulators, so-called 24-hour baths, a problem of proliferation of Legionella pneumophila in hot water of a bath tub since hot water of a bath tub is used under the state of high water temperature and of easily vaporizing chlorine.

Therefore, to safely disinfect water with little content of chlorine has been required. Further, in a water storage place such as an emergency water storage tank outdoors and the like, disinfection by vaporizing chlorine cannot maintain disinfection effect for a long time and before chlorine vaporizes completely, water of a water storage tank must be added, thereby disinfecting, however, since such time-consuming operation is actually not conducted actually, the present situation is that bacterium or green algae grows proliferously. Therefore, simple and economical disinfection method has been required.

Conventionally, it is widely known that silver ion is effective in disinfection. The disinfection treatment by silver ion is a safe disinfection method with no effect on human bodies unless the concentration thereof exceeds specific standard. In addition, it is not a transitory disinfection treatment as by ultraviolet rays or by ozone, and it doe not require any power source, either. Further, unlike disinfection treatment by chlorine, the ingredient does not vaporize. Therefore, such techniques have been known as making various substances carry on silver, letting them dissolve into water as silver ion, and using them as members for disinfecting water. For example, patent document 1 discloses a technique of making activated carbon carry on silver, patent document 2 discloses a technique of making crystalline zeolite carry on silver, and patent document 3 discloses a technique of making silver ion which forms silver complex ion substitute for a part of or the all ions of aluminosilicate.

(Patent document 1) Japan Unexamined patent publication No.Sho 49-61950

(Patent document 2) Japan Unexamined patent publication No.Sho 60-181002

(Patent document 3) Japan Unexamined patent publication No.Hei 1-283204

It is preferable that these members are used in the form of particles since the contact areas with water which is subject to disinfection treatment increase. However, since the specific gravity of any of the above mentioned substances which carry silver is small, when used for water disinfecting members in the form of particles, they are hard to handle since such substances are suspended or are diffused in water. For example, in water baths provided with circulation systems with stream current generation, swimming pools where stream current easily occurs, reservoirs outdoors and the like, sometimes the above mentioned members are diffused with water current. For this reason, a hollow wall between filtering materials is enlarged and treated water does not contact with silver well enough and in many cases, disinfection effect of silver has not been fully developed.

Further, in water purifying treatment, in many cases removal treatment for impurities is conducted together with treatment for disinfecting water to be treated. Here, as removal treatment of water impurities, usually, water purifying treatment by activated carbon and water purifying treatment by using a sand filtration plant is conducted. However, for example, when a new activated carbon is used and the like, when a dried activated carbon is put in water, air which adsorbs the activated carbon becomes air bubble and by this, the contact area with water to be treated is limited and in particular, the capability of removing impurities right after putting an activated carbon has not been fully developed.

In addition, in air cleaners or in humidifiers as well, when materials for disinfection are made into particles, those with small specific gravity cannot be used since they splash by air current. Thus, currently, materials for disinfection are made into fibers, however, when they are made into fibers, clogging is liable to occur and therefore, the sustained effect has been hard to be obtained and in many cases, disinfection effect has not been fully developed.

Further, in a sand filtration plant, although suspending materials in the water is removed by a filtering material of a filtration tank, at the same time, on a surface of a filtering material, algae or microbes grow proliferously. For example, when anthracite, ceramics, and the like are used as filtering materials, on its surface, mainly aerobic bacteria are liable to grow proliferously. On the other hand, when ferrolite, manganese sand and the like are used, anaerobic bacteria are liable to grow proliferously on its surface. In order to remove these, garnet which has high hardness and large specific gravity was mixed with a filtering member and by making both parties collide, microbes grew proliferously on a surface of a filtering material and materials suspended in the water attached was removed, however, such physical method alone could not provide satisfactory cleaning effect.

DISCLOSURE OF THE INVENTION

In order to solve the above mentioned problems, the object of the present invention is to provide particles suitable for use of disinfection treatment of water, with heavy specific gravity as a whole due to particle's large density, with difficulty in suspending and diffusing, and capable of fully showing disinfection effect of silver. Also the object of the present invention is to provide a member for purifying water which can effectively disinfect filtering materials used for a sand filtration plant. In addition, the object of the present invention is to provide a member for purifying water maintaining disinfection property of such particles as well as enhancing water treatment capability of activated carbon which processes water impurities. Further, the object of the present invention is to provide an effective producing method of such particles.

As a result of intensive studies, the present inventor has solved the above problems by employing the following measures.

In other words, the present invention is the invention of particles in which silver is carried on a garnet surface or a surface of a particle whose main ingredient is garnet.

Or the present invention is the invention of particles in which silver granular lump is carried in a group in consecutively and discontinuously on a garnet surface or a surface of a particle whose main ingredient is garnet.

In addition, it is preferable that the ratio of said silver amount carried of said particles is 0.1 to 5% by weight.

In addition, the present invention is the invention of a member for water disinfection in which collective bodies of said particles are used as water disinfection materials.

Further, the present invention is the invention of a member for air disinfection used for a material of disinfecting air by disinfecting moisture in the air using collective bodies of said particles.

Moreover, density of said particles is preferably 3.2 to 4.6 g/cm$^3$. In addition, the average particle diameter of collective bodies of said particles is preferably 0.01 to 10 mm.

The member of water disinfection of the present invention can effectively be used for any use in which water disinfection by silver is required such as for water purification apparatus, water storage tanks, water purifying devices, swimming pools, water tanks for appreciation, sands and stones for house plants, ponds for cultivation, and the like. In addition, a collective body of the particles of the present invention can be used as one of filtering materials of a sand filtration plant. Further, the member of air disinfection of the present invention can effectively be used for air cleaners, humidifiers, or air conditioners having air cleaning function.

The present invention is also the invention of the member for water purification comprising a mixture which is combined at least of collective bodies of said particles and activated carbon.

In addition, the member for water purification of the present invention can effectively be used for water storage tanks, water filtering devices or water purifying devices, and the like.

In addition, the present invention is also the invention of a producing method of particles with silver carried using electrolytic plating method and said electroless plating method can effectively produce particles for disinfection carrying granulated silver having numerous concavities and convexities on said garnet particle surface by impregnating garnet particles in mixed solution of reduced solution in which at least any one of sodium potassium tartarate, glucose, or acetardehyde as a reducing agent, solution of silver nitrate, and ammonium solution.

In addition, it is preferable that the process includes the pre-treatment process of said electroless plating method in which acid treatment is applied to garnet or particles whose main ingredient is garnet, thereby roughening a surface of said particles.

Particles of the present invention are preferable as member materials which disinfect water and moisture in the air. That is, disinfection by particles of the present invention employs a method of disinfection by silver and therefore, the effect on human bodies is infinitely low and since the main ingredient is garnet, even when disinfection treatment is applied to drinking water, ingredients harmful to human bodies do not liquate out in water subject to disinfection treatment. Further, since garnet has large density, it is not suspended or it is not diffused in water in which disinfection treatment is applied the handling is easier when the collective bodies of particles of the present invention are used as a member for water disinfection. Further, since silver has disinfection effect not only for germs but also for fungus, it can inhibit the proliferation of fungus.

Or when particles are such particles in which silver granular lumps are formed consecutively or discontinuously on a garnet or on a particle surface whose main ingredient is garnet, since the contact area with disinfected medium (water or moisture in the air) can be made large, disinfection effect per unit amount and unit time of disinfected medium can be large and as materials for a disinfection member, it can particularly be used preferably.

Further, when the ratio of carrying amount of silver which is carried is 0.1 to 5% by weight as a whole, controlling silver ion concentration liquated out in water which is subject to disinfection treatment becomes easier and economical.

In addition, when an average particle diameter of particle collective bodies of the present invention is 0.01 to 10 mm, since the contact area of particles of the present invention and of water which is subject to disinfection treatment can be large, while preventing the reduction of water current speed when collective bodies of the particle pass, reducing the size of a diameter between filtering particles is available and floating substances can be removed effectively.

Further, a member for air disinfection of the present invention does not cause bad smelled wind which is typically generated in the beginning of the season when used as a filter of air cleaners and the like since silver inhibits proliferation of fungus as well. Further, since the member of the present invention for air disinfection is composed of collective bodies of the particle, clogging is hard to occur and at the same time cleansing of a filter is also easy. In addition, since the specific gravity of garnet is large, leakage of particles from said member is unlikely to occur.

Further, in a sand filtration plant in which collective bodies of the particle of the present invention are used as one of the filtering materials, germs adhered to a filtering material surface can effectively be removed and further, proliferation itself can be inhibited. In such a situation, since garnet has large specific gravity, instead of this garnet, when collective bodies of the particle of the present invention are used, even when the water filtration by microbes for water purification is conducted on a sand filtration surface layer, said microbes are not killed.

Further, since member for water purification of the present invention is a mixture of activated carbon and a particle whose specific gravity is large and whose main ingredient is garnet, air bubbles and the like which adsorb the activated carbon right after a member for water purification of the present invention is put in water to be treated quickly goes off and the impurity removing capability of activated carbon can fully be developed. For this, purification treatment of both removing water impurities and disinfection can be done in a short time.

Further, with the member for water purification of the present invention, for example, when used for water storage tanks and for filtering devices which flows in water for treatment from the upper side flows out purified water from the under side and when water is full, activated carbon is in a state of suspending in the water for treatment since its specific gravity is approximate to that of water. On the other hand, regarding particles with large specific gravity, since a layer of collective bodies of the particle are formed at a bottom surface portion after they pass through the gaps, antibiotic properties of water for treatment can easily be maintained. Further, for example, when a sand filtration plant and a filtering tube is clogged, the clogging may be removed by flowing liquid backward from a sand filtration plant or a filtering tube and in this case, when a member for water purification of the present invention is used, even for backflow at high voltage, since the particles of the present invention have large specific gravity, settling speed is fast and gather in high density at a bottom surface portion, its original disinfection property can quickly be restored.

In addition, with a method of immersing garnet particles in mixture solution composed of reduction solution in which at least either sodium potassium tartrate, glucose or acetoardehide as a reducing agent is dissolved in water and of water solution of silver nitrate, and of ammonium liquid, since silver granular lumps can be carried consecutively and discontinuously forming a group on said garnet particle surface, preferable particles can be produced as water disinfection use or disinfection use of moisture in the air.

Further, as a method of producing particles of the present invention, before said electroless plating process is conducted, by providing a pre-treatment process of roughing garnet particle surfaces, silver gets easily carried on a garnet particle surface and particles with stable quality can effectively be produced.

BRIEF EXPLANATION OF THE DRAWINGS

FIG. 1 is a SEM photograph magnified 300 times of a garnet surface.

FIG. 2 is a SEM photograph magnified 2000 times of a garnet surface.

FIG. 3 is a SEM photograph magnified 300 times of a surface in the embodiment of Example 10 of the present invention.

FIG. 4 is a SEM photograph magnified 2000 times of a surface in the embodiment of Example 10 of the present invention.

FIG. 5 is a SEM photograph magnified 300 times of a surface in the embodiment of Example 12 of the present invention.

FIG. 6 is a SEM photograph magnified 2000 times of a surface in the embodiment of Example 12 of the present invention.

PREFERABLE EMBODIMENT FOR CARRYING OUT THE INVENTION

As particles of the present invention, garnet or a substance whose main ingredient is garnet (hereinafter including this, called garnet simply) is used. Garnet referred to in the present invention is also called a pomegranate stone and it is a general term for nesosilicate minerals. The density of garnet is about 3.15 to 4.3 $g/cm^3$, showing that the specific gravity is one of the largest among materials whose safety is confirmed and said garnet is currently used as a filtering member of water. By using such a substance with large specific gravity, the effect of the present invention can be shown. Therefore, while maintaining such specific gravity or accompanying little decrease in specific gravity to a degree where the effect of the present invention is not damaged (to be specific, maintaining density of about not less than 3.0 $g/cm^3$), substances other than garnet which do not liquate out harmful ingredient to water may be present secondarily. In other words, "whose main ingredient is garnet" of the present invention refers to the state in which such secondary substances other than garnet are present but from the viewpoint of utilizing the specific gravity, the state in which there is no substantial difference from garnet itself.

In the particles of the present invention, silver having disinfection property is carried on a surface of the above mentioned garnet particles. Silver carried on a surface contacts with water and gradually liquates out and shows disinfection effect as a silver ion. Therefore, since it is enough so long as silver is carried on a surface of a substance to be carried, under this condition, for example, another layer may be present between garnet and silver of the surface. Further, silver does not have to be carried on a whole surface of garnet. For this, garnet surface contacts with water to be treated, however, as mentioned above, there is no problem since safety of garnet is confirmed as a substance for filtering member of water.

In order to enhance the disinfection property of particles of the present invention, it is preferable that when particles of the present invention and water contact, a contact area of silver carried on garnet and water is large. For increasing the contact area, it is preferable that on a garnet surface, silver granular lumps are carried in a form of a group continuously or, depending on portions, discontinuously. In other words, silver covers not uniformly on a garnet surface, but plurality of silver granular lumps gather and are present forming a group on a garnet surface. The group of these silver granular lumps is present continuously depending on portions or discontinuously depending on other portions. For this, in the disconnecting portion of a group of silver granular lumps, there is a void portion on a layer where the silver is carried. A garnet surface is not covered with a layer completely in which said silver is carried, but through said void portion, a part thereof appears outside. As specific state in which silver is carried, such embodiments can be exemplified as shown in FIGS. 3 and 4 which are the SEM photographs of silver on a garnet surface which is mentioned in detail later. However, the embodiments of the present invention are not limited to the embodiments shown in FIGS. 3 and 4.

The particles of the present invention are, as collective bodies, used for the use of disinfection treatment of disinfected medium (water or moisture in the air). To use particles of the present invention for a member for disinfection as collective bodies means to make a group composed of plurality of particles one member. In other words, in order to use as a member for water disinfection or a member for air disinfection, collective bodies composed of plurality of particles of the present invention can be used as they are or said collective bodies can be used in the form of filters and the like. The average particle diameter of said particles is preferably 0.01 to 10 mm. When the average particle diameter is too large, it is useless to prepare particle figures in order to increase the contact area with water and on the other hand, when the average particle diameter is too small, it is difficult to carry adequate amount of silver on a garnet surface.

Further, by regulating the carrying amount of silver carried on a surface of a garnet particle of the present invention, the liquating amount of silver ion depending on the case can be regulated. From the viewpoint of harmonization between disinfection effect by water and control of liquating excessive silver ion, the ratio of carrying amount of silver carried is preferably 0.1 to 20% by weight, and further preferably 0.1 to 5% by weight with respect to the total amount. The reason is that when the carrying ratio is within this range, the concentration of silver ion liquating out in water for disinfection to be disinfected can easily be controlled. In other words, when the carrying amount of silver is too little, almost no disinfection effect can be shown. On the other hand, when the carrying amount of silver is too large, controlling of the liquating silver ion becomes difficult and since there is possibility that silver may liquate out more than required level, it is not economical, either. When silver is carried with said preferable carrying ratio, the density of particles as a whole of the present invention is about 3.2 to 4.6 g/cm$^3$.

Particles of the present invention can be used as one of the filtering materials used for a sand filtration plant. As specific examples of filtering materials used for filtration tanks, other than filtering sands, anthracite, ferrolite, manganese sand, and ceramics can be exemplified, however, they are not limited to these. Although garnet is used as a filtering undermost material of the filtration tank, particles of the present invention can be used mixed with garnet replacing one part thereof with such garnet. The mixing ratio of the particles of the present invention to the filtering material is not specifically limited and garnet may be completely replaced with the particles of the present invention. However, considering the effective and economical range, the ratio of the particles of the present invention to the whole mixture of garnet and particles of the present invention is 0.5 to 50% by weight. When the ratio is less than 0.5% by weight, disinfection effect of a filtering material is not enough and on the other hand, even when the ratio exceeds 50% by weight, disinfection effect does not change and therefore is not economical.

Members for Water Purification

The particles of the present invention are independent collective bodies or collective bodies in a mixed state with materials capable of removing impurity ingredient from water such as ion exchange resins, photocatalytic particles, copper, zinc particles and the like and can be used as a member for water purification. Since such member for water purification can disinfect water as well as removing impurities from water to be treated, time for water purification treatment can be shortened.

Among them, members for water purification in which the particles of the present invention and activated carbon are mixed show further effect exceeding the above mentioned effect. Although in many cases members for water purification are used by putting in the water to be treated at the time of water treatment, when the members for water purification of the present invention is used, right after it is put in the water to be treated, impurities removing property by activated carbon can fully be developed. Since air adsorbs to the dried activated carbon, when the carbon is put in the water in a dried state, the adsorbing air becomes air bubble and the contact area with water to be treated becomes small, and the original impurities removing property cannot fully be developed. However, with the members for water purification of the present invention, activated carbon is mixed with garnet particles with large specific gravity. For this, since garnet particles with large specific gravity tend to settle in the water quickly, strong collision occurs between activated carbon which is mixed. By this collision, since the air bubble adsorbing to the activated carbon is removed, the activated carbon can develop its impurities removing property fully right after it is put in the water to be treated and the time for purification treatment can further be shortened.

In order to obtain such synergistic effect as mixtures, the shape of the activated carbon used for members for water purification in the present invention is desirably particle shaped. In addition, the particle diameter is desirably substantially the same size as that of the particles to be mixed. To be specific, it is desirable that the particle diameter of the activated carbon particles is not greater than twice the size of the average particle diameter of the particles to be mixed. When the particle diameter of activated carbon is too large compared with particle diameter of particles, the effect of removing adsorbed air by collision is not satisfactory.

In addition, although the mixture ratio of particles to be mixed and activated carbon can appropriately be modified depending on carrying ratio of silver which is carried on particles, on whether the main object of water to be treated is for impurities removal or for disinfection, generally speaking, the mixture ratio can be used within the volume ratio of 3 to 50% of particles with respect to the total volume amount of a mixture as a whole.

Production Method

Effective production method of particles of the present invention having the above characteristics is explained hereinafter. When the particles of the present invention are produced by a method of spraying silver on garnet particles, since silver is carried only on one side of particles, it is necessary to treat garnet particles by vibrating and stirring them in order to make silver carry on the whole particles. On the other hand, since garnet is an insulating material, carrying on a surface by electrolytic plating method is difficult. For this, as a producing method of particles of the present invention, the method of carrying silver by electroless plating is preferable. Further, the electroless plating method is preferable in that lump shaped silver having innumerable concavities and convexities is easily carried on a garnet surface.

In the eletroless plating method, as its pre-treatment process, the process of making a garnet particle surface rough may be provided. By making a garnet surface rough, silver complex becomes easier to be carried on a garnet surface and carrying silver on a particle surface becomes easier, thereby preparing a garnet particles carrying silver having stable constant quality. In order to roughen a garnet particle surface, treatment by acids such as hydrochloric acid, sulfuric acid, nitric acid, and the like is easy.

Although the solution containing silver ion used for an electroless plating method is not limited as long as the solution contains silver ion, from the cost perspective and the like, it is general to use silver nitrate solution. In addition, it is general to use ammonium complex of silver by adding ammonium to this solution. When the reducing agent is added to the present plating solution and said garnet particles are immersed therein, silver complex is reduced and by the depositing silver, silver is carried on said garnet particle surface. By this, the particles of the present invention can effectively be produced. As reducing agents, those with appropriate reaction speed are preferable. To be specific, Rochelle salt (sodium potassium tartrate), glucose, or acetaldehyde and the like can be exemplified. On the other hand, ascorbic acid has too high reaction speed and glutaraldehyde has too low reaction speed and therefore, both are not preferable.

As a production method of the particles of the present invention, as other method than above mentioned electroless plating method, silver vapor deposition method including sputtering method, plasma discharging method, arc discharging method, glow discharging method, vacuum deposition method and the like can be employed by which garnet particles are vibrated and stirred thereby making the whole of them carry silver. Further, production method also includes by spraying solvent which contains silver particles on garnet particles.

EXAMPLES

Hereinafter, the present invention is further explained by using Examples. However, the present invention is not limited to the embodiment of the Examples.

Production of Particles

Particles in the Examples were produced by electroless plating method. As garnet particles, those manufactured by TOHKEMY CORPORATION were used by fully cleansing garnet with water. A collective body of garnet particles was packed in a plastic contained provided with innumerable small openings. As water solution of silver nitrate, solid silver nitrate (I) manufactured by KISHIDA CHEMICAL CO., LTD. was used by dissolving into purified water. For information, since addition of ammonium to thick water solution of silver nitrate may grow proliferously fulminating silver ($Ag_3N$), when heated high in the mixture of both, it was cooled by water from outside of the container.

Kinds of Reducing Agents

Example 1

As a reducing solution of silver, 9 g (0.25 mol) of D-glucose and 0.8 g ($5.34 \times 10^{-3}$ mol) of sodium potassium tartrate were dissolved in mixture liquid of 200 mL of water and 20 mL of methanol and was employed. To this reducing solution, 40 mL of 0.1 mol/L silver nitrate water solution, $12 \times 10^{-3}$ mol of ammonium water and further, for regulating pH, 0.5 g of sodium hydrate which were dissolved and were mixed. And right after that, the garnet packed in said perforated container was immersed in said mixture liquid together with said container. After leaving as it was for about 19 hours, when the garnet was picked out with the perforated container, white silver adhered to a garnet surface.

Example 2

As a reducing solution of silver, 40 mL of 9 g (0.25 mol) of D-glucose was dissolved in mixture liquid of 200 mL of water and 20 mL of methanol and was employed. To this reducing solution, 40 mL of 0.1 mol/L silver nitrate water solution, $12 \times 10^{-3}$ mol of ammonium water and further, for regulating pH, 0.5 g of sodium hydrate which were dissolved and were mixed. And right after that, the garnet packed in said perforated container was immersed in said mixture liquid together with said container. After leaving as it was for about 19 hours, when the garnet was picked out with the perforated container, white silver adhered to a garnet surface as found in Example 1.

Example 3

As a reducing solution of silver, 40 mL of 0.1 mol/L D-glucose was used. To this reducing solution, 40 mL of 0.1 mol/L silver nitrate water solution, $12 \times 10^{-3}$ mol of ammonium water and further, for regulating pH, 0.5 g of sodium hydrate which were dissolved and were mixed. And right after that, the garnet packed in said perforated container was immersed in said mixture liquid together with said container. After leaving as it was for about 16 hours, when the garnet was picked out with the perforated container, white silver adhered to a garnet surface as found in Example 1.

Example 4

As a reducing solution of silver, 40 mL of 0.1 mol/L acetaraldehyde was used. To this reducing solution, 40 mL of 0.1 mol/L silver nitrate water solution and $12 \times 10^{-3}$ mol of ammonium water dissolved were mixed. And right after that, the garnet packed in said perforated container was immersed in said mixture liquid together with said container. After leaving as it was for about 17 hours, when the garnet was picked out with the perforated container, white silver adhered to a garnet surface, however, compared with that of Example 1, the adhered amount was smaller.

Example 5

As a reducing solution of silver, 40 mL of 0.1 mol/L glutaraldehyde was used. To this reducing solution, 40 mL of 0.1 mol/L silver nitrate water solution and $12 \times 10^{-3}$ mol of ammonium water dissolved were mixed. And right after that, the garnet packed in said perforated container was immersed in said mixture liquid together with said container. After leaving as it was for about 17 hours, when the garnet was picked out with the perforated container, however, no silver adhered to a garnet surface.

Example 6

As a reducing solution of silver, 40 mL of 0.1 mol/L L-ascorbic acid sodium water solution was used. To this reducing solution, 40 mL of 0.1 mol/L silver nitrate water solution and $12 \times 10^{-3}$ mol of ammonium water dissolved were mixed. And right after that, the garnet packed in said perforated container was immersed in said mixture liquid together with said container. Right after the immersion, a large reaction was found. After leaving as it was for about 17 hours, when the garnet was picked out with the perforated container, however, settling of silver was only found and no silver adhered to a garnet surface.

Dependency on Concentration

From the results of Examples 1 to 6, using potassium sodium tartrate which was preferable as a reducing agent of silver, dependency on concentration was further studied.

Example 7

As a reducing solution, 40 mL of 0.01 mol/L sodium potassium tartrate was used. To this reducing solution, 40 mL of 0.01 mol/L silver nitrate water solution and $12 \times 10^{-3}$ mol of ammonium water dissolved were mixed. And right after that, the garnet packed in said perforated container was immersed in said mixture liquid together with said container. After leaving as it was for about 14 hours, when the garnet was picked out with the perforated container, however, no silver adhered to a garnet surface.

Example 8

40 mL of 0.05 mol/L sodium potassium tartrate was used as a reducing solution. To this reducing solution, 40 mL of 0.1 mol/L silver nitrate water solution and $12 \times 10^{-3}$ mol of ammonium water dissolved were mixed. And right after that, the garnet packed in said perforated container was immersed in said mixture liquid together with said container. After leaving as it was for about 14 hours, when the garnet was picked out with the perforated container, silver adhered to a garnet surface although the adhering amount is smaller than that of Example 1.

Example 9

Mixture of 40 mL of 0.813 mol/L sodium potassium tartrate, 8 mL of methanol, and 2 mL of water was used as reducing solution. To this reducing solution, 40 mL of 1.25 mol/L silver nitrate water solution and 0.15 mol of ammonium water were mixed. And right after that, the garnet packed in said perforated container was immersed in said mixture liquid together with said container. After leaving as it was for about 16 hours, when the garnet was picked out with the perforated container, white silver adhered to a garnet surface.

Example 10

Mixture of 40 mL of 1.625 mol/L sodium potassium tartrate, 8 mL of methanol, and 7 mL of water was used as a reducing solution. To this reducing solution, 30 mL of 3.3 mol/L silver nitrate water solution and 0.222 mol of ammonium were mixed. And right after that, the garnet packed in said perforated container was immersed in said mixture liquid together with said container. After leaving as it was for about 16 hours, when the garnet was picked out with the perforated container, silver adhered to a garnet surface uniformly.

Example 11

Mixture of 45 mL of 2.22 mol/L sodium potassium tartrate and 8.7 mL of methanol was used as a reducing solution. To this reducing solution, 15 mL of 13.3 mol/L silver nitrate water solution and 0.503 mol of ammonium water dissolved were mixed. And right after that, the garnet packed in said perforated container was immersed in said mixture liquid together with said container. After leaving as it was for about 15 hours, when the garnet was picked out with the perforated container, silver adhered to a garnet surface uniformly.

Example 12

In Example 12, garnet particles with silver carried were obtained by sputtering vapor deposition method. Garnet particles were put in a mesh bag and with said bag, it was fixed in a chamber and said chamber was kept in a vacuum state of 0.3 Pa. Next, targeted silver was subject to radiation by the electric wires of DC 800 V and 3000 W for thirty seconds to one minute, thereby conducting silver sputtering on a garnet particle surface. Since a sputtering device used in the experiment was the sputtering device capable of shaking sputtering device together with a device holder, during sputtering process, by shaking the holder of said sputtering device, it was so arranged that silver could adhere on garnet particles in a bag uniformly. After the completion of sputtering, on a garnet particle surface picked out of a chamber, silver adhered uniformly.

Comparative Example 1

A silver wire with a diameter of 2.5 mm (950 silver, silver purity 95%) was cut in 2.5 mm each with a pair of pliers and silver with a particle shape was obtained.

(Surface Observation by SEM Photographs)

SEM (scanning electronic microgram) photographs of a surface of a garnet used in Examples and a surface of a garnet with silver carried in Examples 10 and 12 are shown as follows. For a SEM photograph equipment, "JSM-5800 LVC" (manufactured by JEOL) was employed. Photographs were taken with the two magnifications of 300 times and 2000 times. In the SEM photographs of 300 times, the length of 50 µm is displayed under the image and in the SEM photographs of 2000 times, the length of 10 µm is displayed under the image.

FIGS. 1 and 2 are SEM photographs of a garnet surface in which FIG. 1 is 300 times and FIG. 2 is 2000 times.

FIGS. 3 and 4 are SEM photographs of Example 10 in which FIG. 3 is 300 times and FIG. 4 is 2000 times.

FIGS. 5 and 6 are SEM photographs of Example 12 in which FIG. 5 is 300 times and FIG. 6 is 2000 times.

From FIGS. 3 and 4, on a particle surface of Example 10 in which silver is carried by electroless plating method, on a garnet surface, lump shaped silver forms innumerable groups and depending on portions, the silver was scattered about continuously and discontinuously depending on portions and as a result, said particle surface is found to be a state of concavities and convexities. From said discontinuous portions, void portions appear and from said void portions, a part of a garnet surface is found.

On the other hand, from FIGS. 5 and 6, on a particle surface of Example 12 in which silver is carried by a sputtering method, as a result that silver adheres flatly, it is found that said particle surface is in the same state as in a garnet surface shown in FIGS. 1 and 2.

(Test on Silver Liquation)

2 polyethylene containers provided with pores with a radius of 1.5 mm at a bottom surface and at a side surface and further provided with large pores with a radius of 15 mm at three side surfaces were prepared and 8.51 g of particles of Example 10 and 8.52 g of particles of Comparative Example 1 were put therein. After confirming that these particles do not spill out of the pores of polyethylene containers, said particles were immersed together with polyethylene containers respectively in beakers in which 250 mL of distilled water and a magnet stirrer were put. By doing this, direct collision of stirrers and particles could be avoided by making the stirrers rotate and further, direct contact of water flow generated by the rotation of the stirrers with particles could be avoided. In other words, with this experimental method, influence to silver liquation by the impact of stirrers and particles can be avoided. It was kept stirring for 46 hours with this state. After that the immersed particles were picked out of the water and regarding remaining water, concentration of silver liquation was measured. As a result, concentration of silver liquation of water with particles of Example 10 and Comparative Example 1 therein was 0.705 mg/L and 0.002 mg/L, respectively.

(Test on Disinfection)

40 g of particles of Examples 10 and 12 were immersed in 1 L of disinfected purified water. Next, 0.1 mL of culture liquid of *Escherichia coli* IFO 3972 cultured by common bouillon culture medium was injected to said purified water and was preserved at a temperature of 25 degree centigrade. And then, the number of germs alive in purified water right after the injection and in 24 hours was measured. For information, those without samples were used as objects. Measurement of the number of germs was conducted by poured plate medium disclosed in "Standard Methods of Analysis for Hygienic Chemists, Note" (2000) edited by The Pharmaceutical Society of Japan. However, as medium for microbes, common agar culture medium was used. Right after the injection, the number of germs alive was $4 \times 10^5$/mL in both samples with particles of Example 10 and object samples. The number of germs alive in 24 hours was $4 \times 10^5$/mL for object samples which was unchanged from right after the injection, while no *Escherichia coli* was detected for samples with particles of Example 10.

INDUSTRIAL APPLICABILITY

Particles of the present invention have wide applicability as materials of members used for disinfecting water or moisture in the air by silver. In addition, particles of the present invention can be utilized as a method for effectively manufacturing such particles. Further, a member for water purification of the present invention can widely be used as a member required for removing impurities from water and disinfection.

To be specific, collective bodies of the particles of the present invention can preferably be used as a member for water disinfection or a member for air disinfection. Further, a member for water disinfection or a member for air disinfection of the present invention can be used for the following purposes.

In a water purification apparatus, for example, when a member for water disinfection of the present invention is used for a water purification filter for disinfection, since collective bodies of particles can make the contact area large, effective water disinfection is available even when the contact with water is for a short time. Moreover, collective bodies of said particles do not diffuse at the time of inflow or outflow of water, which makes handling easier. Further, in a water purification tank, for example, when a member for water disinfection of the present invention is placed at a bottom surface of a water storage portion, since said particles never rise to a water surface, stable disinfection effect can be obtained and therefore can preferably be used. Further, in a swimming pool, for example, by placing collective bodies of the particles of the present invention at a bottom of a pool or in a water circulation device, effective disinfection is available without any vaporization unlike in the case of disinfection by chloride. Further, in a bath tub with through water purification tank, for example, when a member for water disinfection of the present invention is used in a bath tub with through water purification tank, since vaporization does not occur unlike in the case of disinfection by chloride, effective disinfection of *Legionella* bacteria is available. Further, in a water tank for appreciation for fish and the like, by laying a member for water disinfection of the present invention instead of gravel at a bottom of a water tank for appreciation which can proliferate in a sand bottom surface, proliferation of disease bacteria which affect fish such as fish tail rot disease and *Vorticella* Nebulifera disease can be prevented. Moreover, since garnet itself is a mineral, even when it is used instead of gravel, it does not damage the good view as a water tank for appreciation. In addition, in a tank farming which is utilized for cultivation by circulating water, for example, by providing a member for water disinfection of the present invention in a circulating device, it can be utilized for prevention of root rot of cultivated plants.

Further, utilizing the points that garnet is conventionally used in undermost part of a sand filtration plant, by placing a part of a filtering material of a garnet used for a filtration tank with collective bodies of particles of the present invention, secured water disinfection is available in the last stage of sand filtration.

In addition, by filling collective bodies of the particles of the present invention in a stainless mesh case or a bag made of a non-woven cloth, a member for water disinfection with large specific gravity is hard to be affected by water flow can be prepared. For this, this member for water disinfection can obtain disinfection effect only by putting or suspending in water to be treated. Therefore, it can effectively be used in particular as a member of water storage tanks, water receiver tanks, cooling chiller units, bath tubs, and the like.

The above mentioned characteristics particularly function preferably for storages or reservoirs which store rain water for emergency such as time for scarce rain or disaster. Water stored for such emergency is normally kept in the state where water is stored for a long time and when it is to be used, in many cases bacteria or green algae grows proliferously and cannot be used for water for daily use. When a member for water disinfection of the present invention is used, since disinfection effect thereof lasts for a long time, only by replacing collective bodies of particles regularly, a certain level of quality can be retained as a emergency water. Further, since the particles of the present invention have large specific gravity, even when rain pours in suddenly in a great amount such as in torrential rain and the like, since it is not affected by water flow, particles do not flow outside.

In addition, since the filtering tube using a member of water disinfection of the present invention does not consume chloride, when the filtering tube is provided on switching portions from distributing water pipes to water supply pipe for water supply to hospitals, public halls, and for household, in addition to the ordinary chloride disinfection effect, disinfection effect by silver is also available and therefore it can effectively be used as a member for providing water which is nearly sterilized.

In addition, the member for water disinfection of the present invention can preferably be used in particular, for water treatment device which has a water storage portion. To be specific, in water storage tanks or in filtering device, it can be utilized as a member for water purification capable of always providing highly sterilized purified water. Further, in a water purification device, right after a member for water purification of the present invention is initially put in water to be treated, it can be utilized as a member for water disinfection capable of effectively showing the water purification function.

Moreover, the member for air disinfection of the present invention can be used for filters for air cleaners or air conditioners or humidifiers which can inhibit the proliferation of fungus.

What is claimed is:

1. A production method of particles for disinfection by electroless plating method, wherein said electroless plating method is the production method of particles carrying silver by immersing garnet particles in a mixture solution composed of a reducing solution in which at least any one of sodium potassium tartarate, glucose, or acetaldehyde as a reducing agent is dissolved in water, silver nitrate solution and ammonium solution.

2. A production method of particles as set forth in claim 1, having the process of making a surface of said particles rough by applying an acid treatment to a garnet or particles whose main ingredient is a garnet as pre treatment process of said electroless plating method.

* * * * *